US008873056B2

United States Patent
Shibayama et al.

(10) Patent No.: US 8,873,056 B2
(45) Date of Patent: *Oct. 28, 2014

(54) SPECTROSCOPIC SENSOR

(75) Inventors: Katsumi Shibayama, Hamamatsu (JP); Masaomi Takasaka, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/817,954

(22) PCT Filed: Sep. 21, 2011

(86) PCT No.: PCT/JP2011/071536
§ 371 (c)(1),
(2), (4) Date: Feb. 20, 2013

(87) PCT Pub. No.: WO2012/070302
PCT Pub. Date: May 31, 2012

(65) Prior Publication Data
US 2013/0148125 A1   Jun. 13, 2013

(30) Foreign Application Priority Data
Nov. 22, 2010 (JP) ................. 2010-260435

(51) Int. Cl.
*G01N 21/25* (2006.01)
*G01J 3/51* (2006.01)
*G01J 3/26* (2006.01)

(52) U.S. Cl.
CPC .... *G01J 3/51* (2013.01); *G01J 3/26* (2013.01); *G01J 3/513* (2013.01)
USPC ........................................ 356/419

(58) Field of Classification Search
USPC .......................................... 356/419
See application file for complete search history.

(56) References Cited

U.S. PATENT DOCUMENTS 6,198,864 B1 * 3/2001 Lemoff et al. ................. 385/47
2011/0043823 A1   2/2011 Hillmer et al.

FOREIGN PATENT DOCUMENTS

JP       64-57134       3/1989
JP       H9-277396      10/1997
(Continued)

OTHER PUBLICATIONS

International Search Report of PCT/JP2011/071535 dated Jan. 10, 2012.
(Continued)

*Primary Examiner* — Abdullahi Nur
(74) *Attorney, Agent, or Firm* — Drinker Biddle & Reath LLP

(57) ABSTRACT

A spectroscopic sensor 1 comprises a plurality of interference filter units 20A, 20B, 20C, having a cavity layer 21 and first and second mirror layers 22, 23 opposing each other through the layer 21, for selectively transmitting therethrough light in a predetermined wavelength range according to an incident position thereof; a light-transmitting substrate 3, arranged on the first mirror layer 22 side, for transmitting therethrough the light incident on the units 20A, 20B, 20C; and a light detection substrate 4, arranged on the second mirror layer 23 side, for detecting the light transmitted through the units 20A, 20B, 20C. The second mirror layers 23 are separated for the respective units 20A, 20B, 20C. The cavity layer 21 is formed integrally over the units 20A, 20B, 20C, while a part of the layer 21 enters a region between the second mirror layers 23, 23 adjacent to each other.

4 Claims, 9 Drawing Sheets

(56) References Cited

FOREIGN PATENT DOCUMENTS

| | | |
|---|---|---|
| JP | H11-052128 | 2/1999 |
| JP | 2000-081512 | 3/2000 |
| JP | 2000-206326 | 7/2000 |
| JP | 2001-210810 | 8/2001 |
| JP | 2002-502120 | 1/2002 |
| JP | 2003-270042 | 9/2003 |
| JP | 2006-58301 | 3/2006 |
| JP | 2006-120800 | 5/2006 |
| WO | 2006/100903 | 9/2006 |
| WO | WO 2008/017490 | 2/2008 |

OTHER PUBLICATIONS

English-language translation of International Preliminary Report on Patentability (IPRP) dated Jun. 20, 2013 that issued in WO Patent Application No. PCT/JP2011/071535.

U.S. Notice of Allowance issued in U.S. Appl. No. 13/817,876 dated Dec. 23, 2013.

* cited by examiner

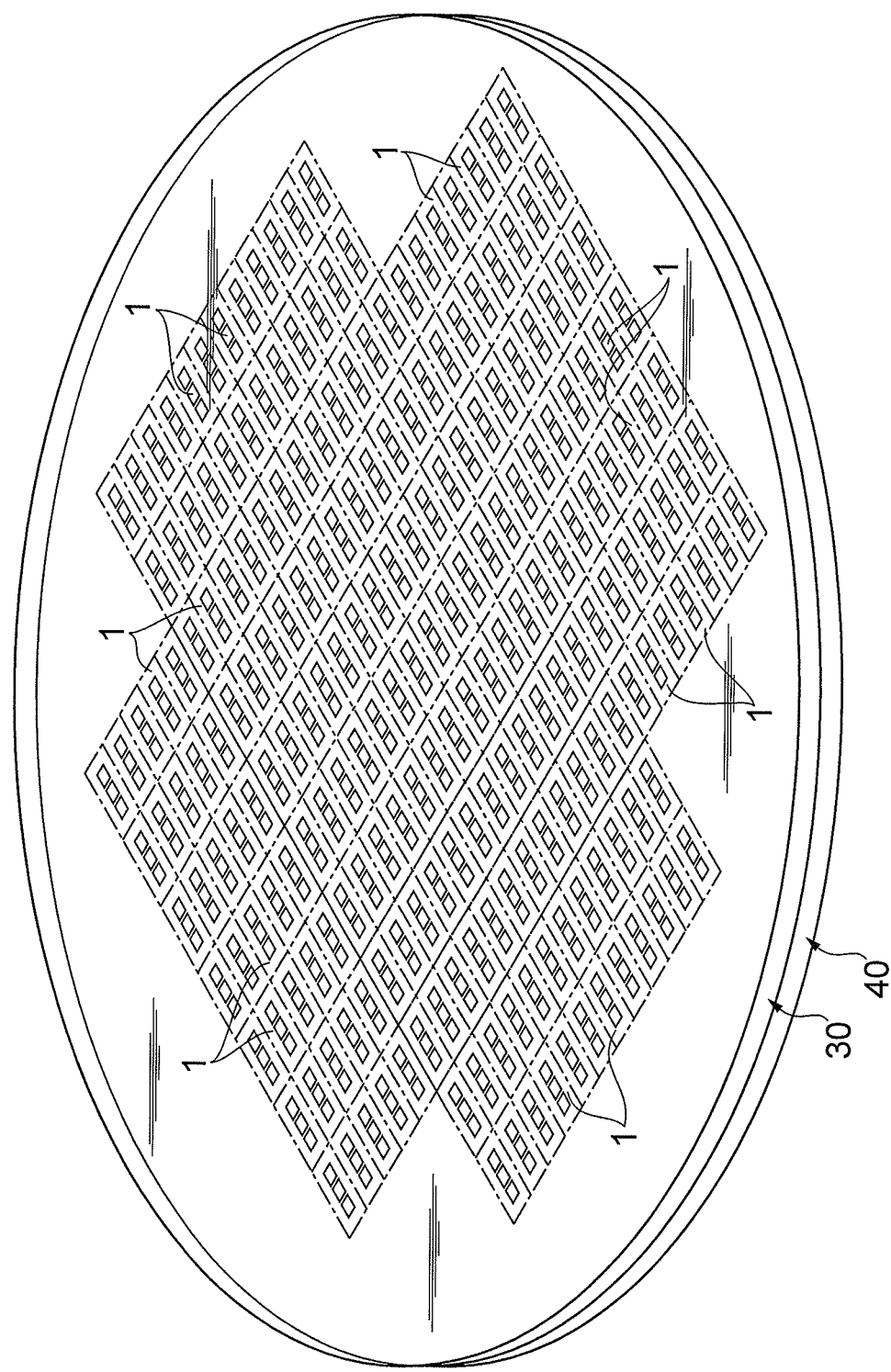

SPECTROSCOPIC SENSOR

TECHNICAL FIELD

The present invention relates to a spectroscopic sensor.

BACKGROUND ART

Known as a conventional spectroscopic sensor is one comprising a plurality of interference filter units for transmitting therethrough light having a predetermined wavelength according to an incident position of the light, a light-transmitting substrate for transmitting therethrough the light incident on the interference filter units, and a light detection substrate for detecting the light transmitted through the interference filter units. There is a case where each interference filter unit is constructed as that of Fabry-Perot type by making a pair of mirror layers oppose each other through a cavity layer (see, for example, Patent Literature 1).

CITATION LIST

Patent Literature

Patent Literature 1: Japanese Patent Application Laid-Open No. 2006-58301

SUMMARY OF INVENTION

Technical Problem

In spectroscopic sensors such as the one mentioned above, the interference filter units may deteriorate or break under temperature cycles when in use. In particular, the cavity layer, which is a layer of several hundreds of nm or less made of a resin, for example, is such a delicate layer as to be likely to peel off from the mirror layers when members constituting the interference filter units expand/contract.

It is therefore an object of the present invention to provide a highly reliable spectroscopic sensor.

Solution to Problem

For achieving the above-mentioned object, the spectroscopic sensor in accordance with one aspect of the present invention comprises a plurality of interference filter units, having a cavity layer and first and second mirror layers opposing each other through the cavity layer, for selectively transmitting therethrough light in a predetermined wavelength range according to an incident position thereof; a light-transmitting substrate, arranged on the first mirror layer side, for transmitting therethrough the light incident on the interference filter units; and a light detection substrate, arranged on the second mirror layer side, for detecting the light transmitted through the interference filter units; wherein the second mirror layers are separated for the respective interference filter units; and wherein the cavity layer is formed integrally over the interference filter units, while a part of the cavity layer enters a region between the second mirror layers adjacent to each other.

In this spectroscopic sensor, the cavity layer is formed integrally over the interference filter units, while a part of the cavity layer enters a region between the first mirror layers adjacent to each other. This prevents the cavity layer from peeling off from the first mirror layer even if members constituting the interference filter units expand/contract under temperature cycles when the spectroscopic sensor is in use. Therefore, a highly reliable spectroscopic sensor can be provided.

Here, the first mirror layers may be separated for the respective interference filter units, while an optical resin layer for joining the light-transmitting substrate onto the first mirror layers may enter a region between the first mirror layers adjacent to each other. This can improve the bonding strength of the light-transmitting substrate and the mechanical strength of the spectroscopic sensor as a whole.

The spectroscopic sensor may further comprise an optical filter layer, formed on the light-transmitting substrate so as to oppose the first mirror layer, for transmitting therethrough the light in the predetermined wavelength range. This can make the light in the predetermined wavelength range efficiently incident on the interference filter unit.

Advantageous Effects of Invention

The present invention can provide a highly reliable spectroscopic sensor.

BRIEF DESCRIPTION OF DRAWINGS

FIG. 9 is a perspective view for explaining the method of manufacturing the spectroscopic sensor of FIG. 1.

DESCRIPTION OF EMBODIMENTS

Figure 1:
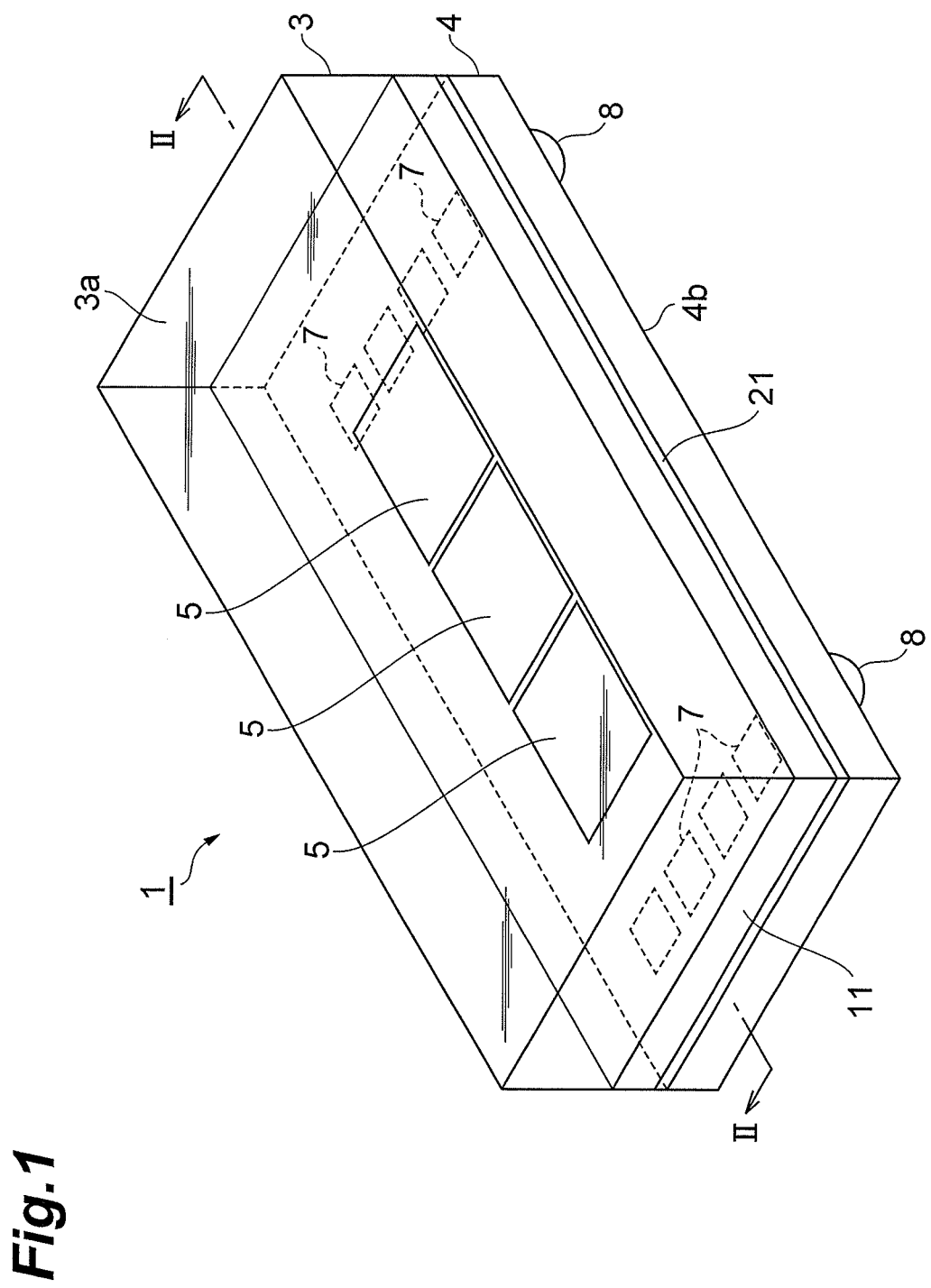
FIG. 1 is a perspective view of the spectroscopic sensor in accordance with one embodiment of the present invention.

In the following, preferred embodiments of the present invention will be explained in detail with reference to the drawings. In the drawings, the same or equivalent parts will be referred to with the same signs while omitting their overlapping descriptions.

Figure 2:
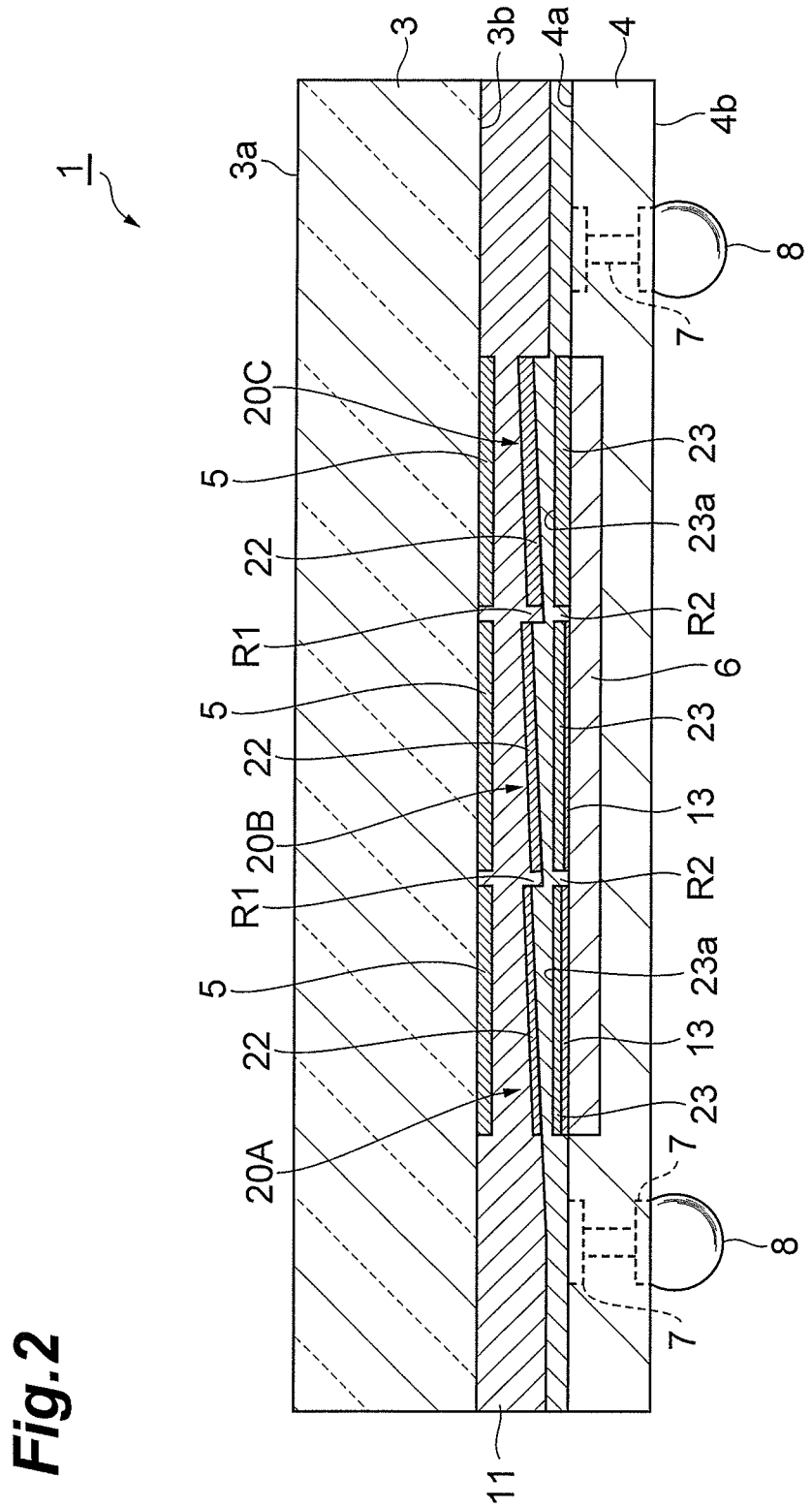
FIG. 2 is a sectional view taken along the line II-II of FIG. 1.

As illustrated in FIGS. 1 and 2, a spectroscopic sensor 1 comprises a plurality of interference filter units 20A, 20B, 20C for selectively transmitting therethrough light in a predetermined wavelength range according to an incident position thereof, a light-transmitting substrate 3 for transmitting therethrough the light incident on the interference filter units 20A to 20C, and a light detection substrate 4 for detecting the light transmitted through the interference filter units 20A to 20C. The spectroscopic sensor 1 is constructed as a rectangular parallelepiped CSP (Chip Size Package), while the interference filter units 20A to 20C are arranged in a row longitudinally of the spectroscopic sensor 1 between the light-transmitting substrate 3 and the light detection substrate 4.

The light-transmitting substrate 3, which is made of glass or the like, is formed into a rectangular sheet having a thickness of about 0.2 to 2 mm. Optical filter layers 5 are formed on a rear face 3b of the light-transmitting substrate 3 so as to oppose the respective interference filter units 20A, 20B, 20C. Each optical filter layer 5, which is a dielectric multilayer film or organic color filter (color resist), is formed into a rectangular film having a thickness of about 0.1 to 10 µm. The optical filter layers 5 function as bandpass filters for transmitting therethrough light in a predetermined wavelength range to be made incident on their opposing interference filter units 20A to 20C.

The light detection substrate 4, which is a photodiode array, is formed into a rectangular sheet having a thickness of about 10 to 150 µm. A light-receiving unit 6 for receiving the light transmitted through the interference filter units 20A to 20C is formed on a front face 4a of the light detection substrate 4. The light-receiving unit 6 is constructed by one-dimensionally arranging elongated photodiodes, each extending along a direction substantially perpendicular to the longitudinal direction of the light detection substrate 4, longitudinally of the light detection substrate 4. The light detection substrate 4 is also formed with leads 7 (front face leads, rear face leads, through-hole leads, etc.) for taking out electric signals photoelectrically converted by the light-receiving unit 6. The rear face 4b of the light detection substrate 4 is provided with surface-mounting bumps 8 electrically connected to their corresponding leads 7. The light detection substrate 4 is not limited to the photodiode array, but may be any of other semiconductor light detection elements (C-MOS image sensors, CCD image sensors, etc.).

Each of the interference filter units 20A, 20B, 20C has a cavity layer 21 and DBR (Distributed Bragg Reflector) layers 22, 23. In each of the interference filter units 20A to 20C, the DBR layer (first mirror layer) 22 and DBR layer (second mirror layer) 23 oppose each other through the cavity layer 21. That is, the cavity layer 21 keeps a distance between the DBR layers 22, 23 opposing each other (while the thickness of the cavity layer 21 varies among the interference filter units 20A, 20B, 20C). Each of the DBR layers 22, 23 is a dielectric multilayer film formed into a rectangular film having a thickness of about 0.1 to 10 µm. The interference filter units 20A, 20B, 20C have the respective DBR layers 22 with thicknesses different from each other and similarly the respective DBR layers 23 with thicknesses different from each other. However, surfaces 23a of the DBR layers 23 facing the cavity layer 21 are positioned on substantially the same plane by spacers 13.

The DBR layers 22, which are located closer to the light-transmitting substrate 3 than is the cavity layer 21, are separated from each other for their corresponding interference filter units 20A to 20C. The DBR layers 23, which are located closer to the light detection substrate 4 than is the cavity layer 21, are separated from each other for their corresponding interference filter units 20A to 20C. A region R1 between the adjacent DBR layers 22, 22 and a region R2 between the adjacent DBR layers 23, 23 each have a width of about 0.5 to 10 µm.

The cavity layer 21, which is made of a light-transmitting material (an optical resin, glass, a semiconductor, a dielectric, or the like), is integrally formed over the interference filter units 20A to 20C. A part of the cavity layer 21 enters the region R2 between the adjacent DBR layers 23, 23. The cavity layer 21 has outer edge parts reaching their corresponding side faces of the spectroscopic sensor 1 (i.e., side faces of the light-transmitting substrate 3 and light detection substrate 4), so that their side faces are flush with each other. In each of the interference filter units 20A to 20C, the thickness of the cavity layer 21 gradually increases within the range of about 100 to several hundreds of nm to one side longitudinally of the spectroscopic sensor 1. As a consequence, the wavelength of light incident on each channel of the light-receiving unit 6 of the light detection substrate 4 is uniquely determined by the kind and thickness of the DBR layers 22, 23 and thickness of the cavity layer 21 in the part opposing the channel.

The light-transmitting substrate 3, which is arranged closer to the DBR layers 22 than is the cavity layer 21, is joined to the DBR layers 22 with an optical resin layer 11 interposed therebetween. As a consequence, the optical filter layers 5 oppose their corresponding DBR layers 22 of the interference filter units 20A to 20C through the optical resin layer 11. The optical resin layer 11 enters the region R1 between the adjacent DBR layers 22, 22 and regions between the adjacent optical filter units 5, 5. The light detection substrate 4, which is arranged closer to the DBR layers 23 than is the cavity layer 21, is joined to the cavity layer 21 and DBR layers 23. The optical resin layer 11 is made of an optical resin such as an organic material based on epoxy, acrylic, or silicone or an organic-inorganic hybrid material and formed with a thickness of about 5 to 100 µm.

When the light entering the light-transmitting substrate 3 from its front face 3a passes therethrough and reaches its rear face 3b in thus constructed spectroscopic sensor 1, only light in a predetermined wavelength to be incident on the interference filter units 20A to 20C is transmitted through the optical filter layers 5. When the light transmitted through the optical filter layers 5 is incident on the interference filter units 20A to 20C, light in a predetermined wavelength range is selectively transmitted therethrough according to its incident position. That is, the wavelength of light incident on each channel of the light-receiving unit 6 of the light detection substrate 4 is uniquely determined by the kind and thickness of the DBR layers 22, 23 and thickness of the cavity layer 21 at the incident position. As a consequence, different wavelengths of light are detected for the respective channels of the light-receiving unit 6 in the light detection substrate 4.

In the spectroscopic sensor 1, as explained in the foregoing, the cavity layer 21 is formed integrally over the interference filter units 20A to 20C, while a part of the cavity layer 21 enters the region R2 between the adjacent DBR layers 23, 23. This prevents the cavity layer 21 from peeling off from the DBR layers 23 even if members constituting the interference filter units 20A to 20C expand/contract under temperature cycles when the spectroscopic sensor 1 is in use. Therefore, the spectroscopic sensor 1 having a high reliability can be provided.

The optical resin layer 11 for joining the light-transmitting substrate 3 onto the DBR layers 22 enters the region R1 between the adjacent DBR layers 22, 22 and regions between the adjacent optical filter layers 5, 5. This can improve the bonding strength of the light-transmitting substrate 3 and the mechanical strength of the spectroscopic sensor 1 as a whole.

The optical filter layers 5 are formed on the light-transmitting substrate 3 so as to oppose the respective DBR layers 22 of the interference filter units 20A to 20C. This can make the light in the predetermined wavelength range efficiently incident on the interference filter units 20A to 20C.

Figure 3:
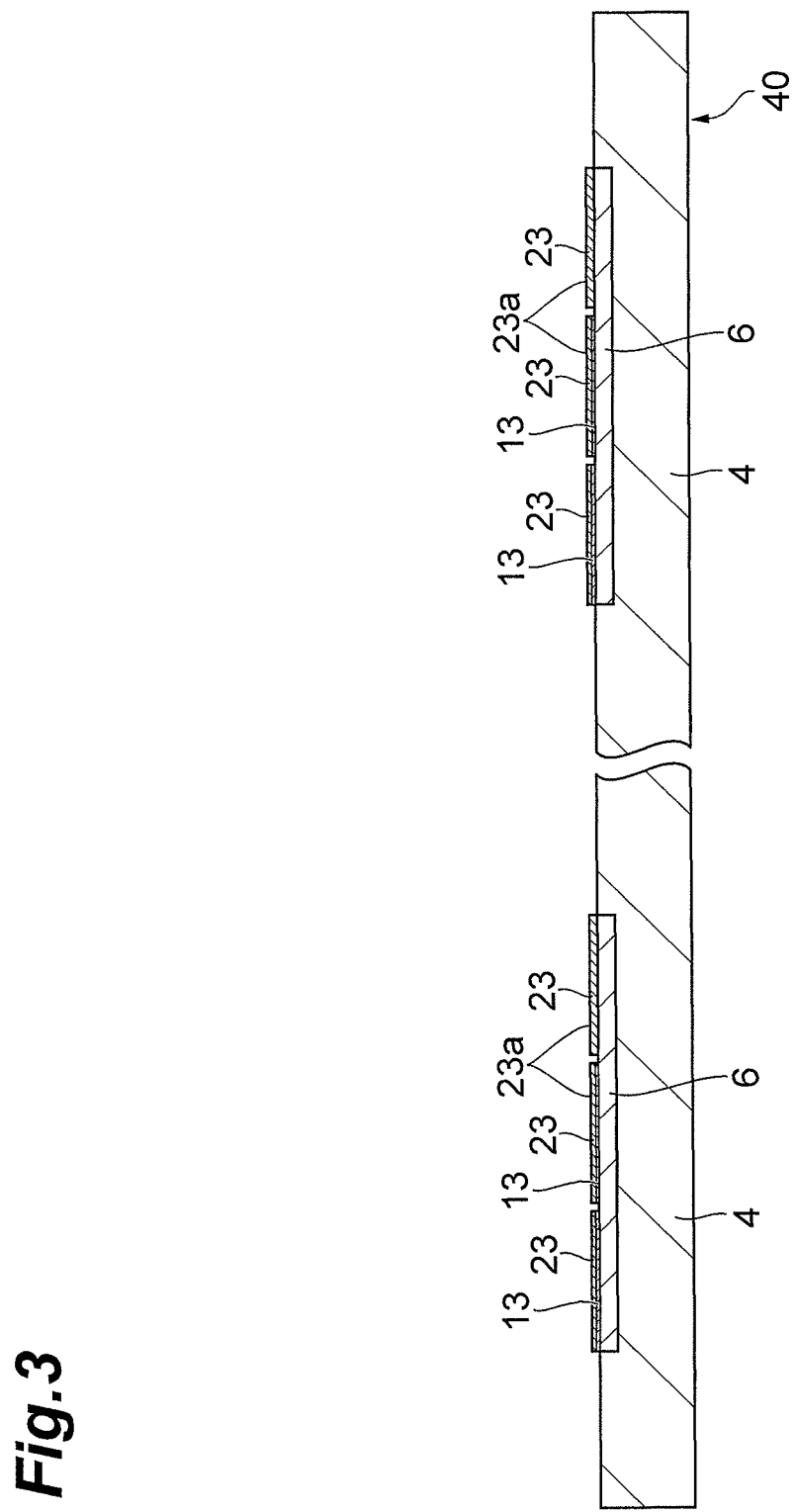
FIG. 3 is a sectional view for explaining a method of manufacturing the spectroscopic sensor of FIG. 1.

A method of manufacturing the above-mentioned spectroscopic sensor 1 will now be explained. First, as illustrated in FIG. 3, a light detection wafer 40 including a plurality of light detection substrates 4 arranged in a matrix is prepared, and DBR layers 23 are formed for each part corresponding to one spectroscopic sensor 1. For forming the DBR layers 23, film-forming by ion plating, vapor deposition, sputtering, or the like and patterning by photo-etching and liftoff or etching are performed. Each of the DBR layers 23 is a dielectric multilayer film which is a laminated film made of $SiO_2$, $TiO_2$, $Ta_2O_5$, $Nb_2O_5$, $Al_2O_3$, $MgF_2$, or the like.

Here, spacers 13 are formed between the front face 4a of the light detection substrate 4 and the DBR layers 23, so as to position the surfaces 23a of the DBR layers 23 on substantially the same plane. The spacers 13 can be formed from the same material as that of a layer constituting a part of the DBR layers 23 by the same process as that of the DBR layers 23. This can make it easier to position the spacers 13 and the DBR layers 23 with respect to each other and adjust the height of the surfaces 23a of the DBR layers 23.

Figure 4:
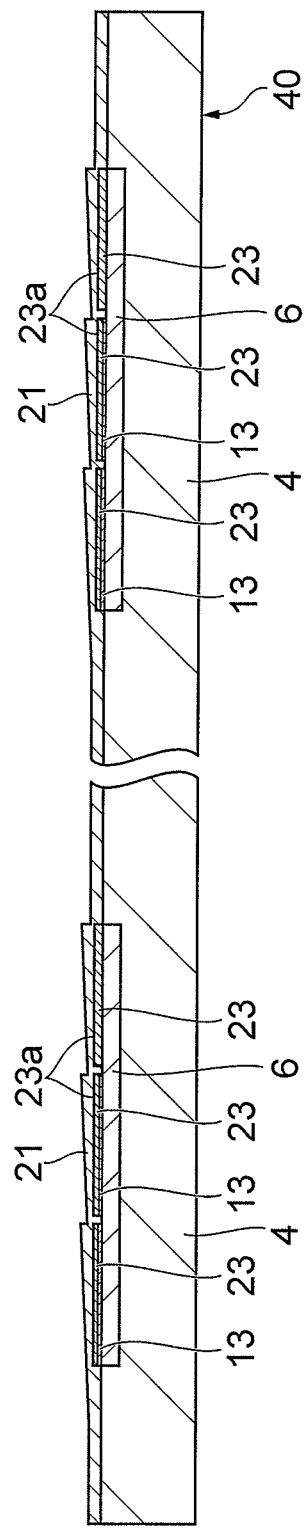
FIG. 4 is a sectional view for explaining the method of manufacturing the spectroscopic sensor of FIG. 1.

Next, as illustrated in FIG. 4, a cavity layer 21 is formed integrally by nanoimprinting on the surfaces 23a of the DBR layers 23 for each part corresponding to one spectroscopic sensor 1. Here, a part of the cavity layer 21 is allowed to enter regions between the adjacent DBR layers 23, 23. The outer edge parts of the cavity layer 21 are made to reach and become flush with their corresponding side faces of the light detection wafer 40. For performing the nanoimprinting, a material for the cavity layer 21 is substantially uniformly applied to the whole front face of the light detection wafer 40 so as to cover the DBR layers 23 and shaped into a desirable cavity form by a mold under heat, pressure, UV irradiation, or the like. The molding by nanoimprinting may be performed in the unit of a chip (a part corresponding to one spectroscopic sensor 1) or in the unit of a block containing a plurality of chips by a step-and-repeat scheme or at once on the whole surface. Since the surfaces 23a of the DBR layers 23 are positioned on substantially the same plane by the spacers 13, the cavity layer 21 having a high accuracy can be obtained stably.

Figure 5:
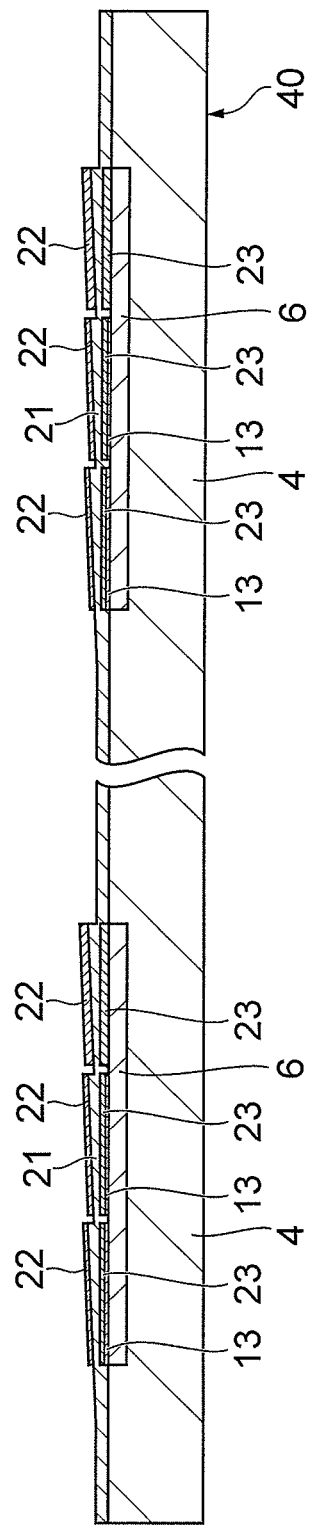
FIG. 5 is a sectional view for explaining the method of manufacturing the spectroscopic sensor of FIG. 1.

Thereafter, as illustrated in FIG. 5, DBR layers 22 are formed on the cavity layer 21 for each part corresponding to one spectroscopic sensor 1. For forming the DBR layers 22, film-forming by ion plating, vapor deposition, sputtering, or the like and patterning by photo-etching and liftoff or etching are performed. Each of the DBR layers 22 is a dielectric multilayer film which is a laminated film made of $SiO_2$, $TiO_2$, $Ta_2O_5$, $Nb_2O_5$, $Al_2O_3$, $MgF_2$, or the like.

Figure 6:
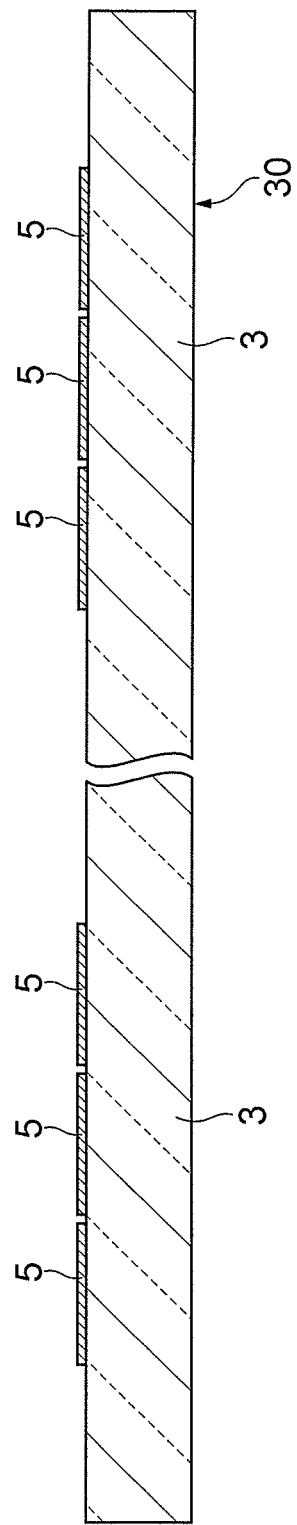
FIG. 6 is a sectional view for explaining the method of manufacturing the spectroscopic sensor of FIG. 1.

On the other hand, as illustrated in FIG. 6, a light-transmitting wafer 30 including a plurality of light-transmitting substrates 3 arranged in a matrix is prepared, and optical filter layers 5 are formed for each part corresponding to the light-transmitting substrate 3 on the light-transmitting wafer 30 (i.e., on the light-transmitting substrate 3). When forming the optical filter layers 5 from a dielectric multilayer film, film-forming by ion plating, vapor deposition, sputtering, or the like and patterning by photo-etching and liftoff or etching are performed. When forming the optical filter layers 5 from an organic color filter, it is patterned by exposure/development or the like as with a photoresist.

Figure 7:
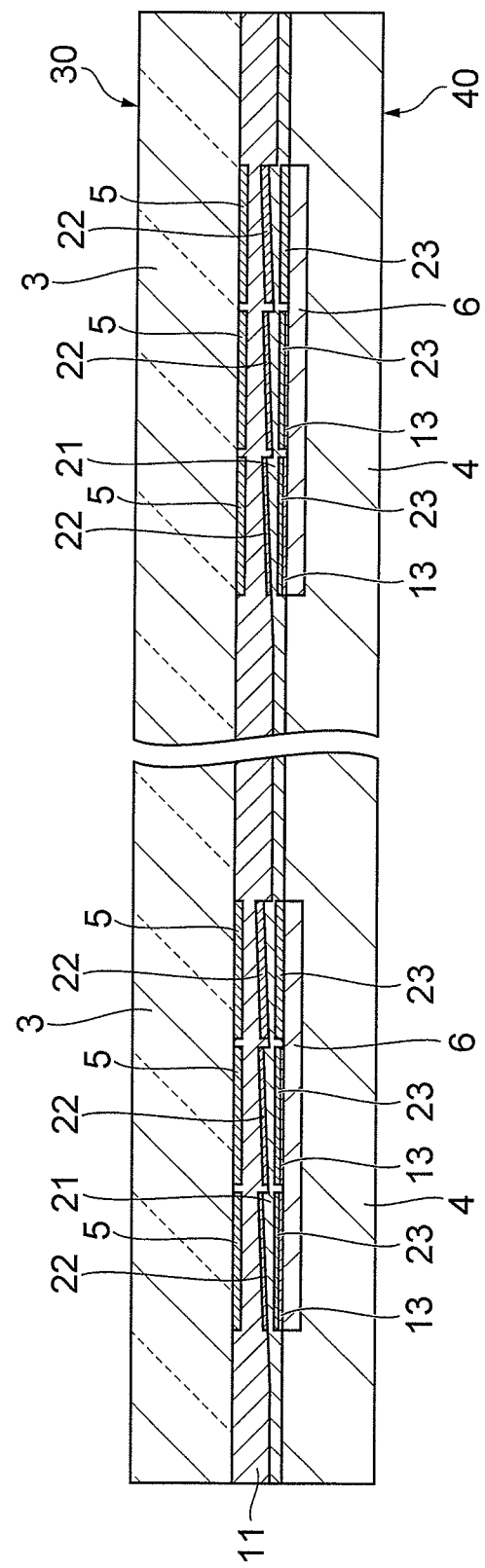
FIG. 7 is a sectional view for explaining the method of manufacturing the spectroscopic sensor of FIG. 1.

Next, as illustrated in FIG. 7, the light detection wafer 40 and the light-transmitting wafer 30 are joined to each other with the optical resin layer 11 such that the DBR layers 22 oppose their corresponding optical filter layers 5 for each part corresponding to one spectroscopic sensor 1. That is, the light-transmitting substrate 3 is joined onto the DBR layers 22 with the optical resin layer 11 interposed therebetween such that the DBR layers 22 oppose the optical filter layers 5. For this joint, after the optical resin layer 11 is applied to the whole surface of at least one of the light detection wafer 40 and light-transmitting wafer 30, the light detection wafer 40 and the light-transmitting wafer 30 are aligned with each other and joined together under heat, pressure, UV irradiation, or the like. Here, joining them in vacuum and then returning them into the air can inhibit voids from occurring in the optical resin layer 11.

Figure 8:
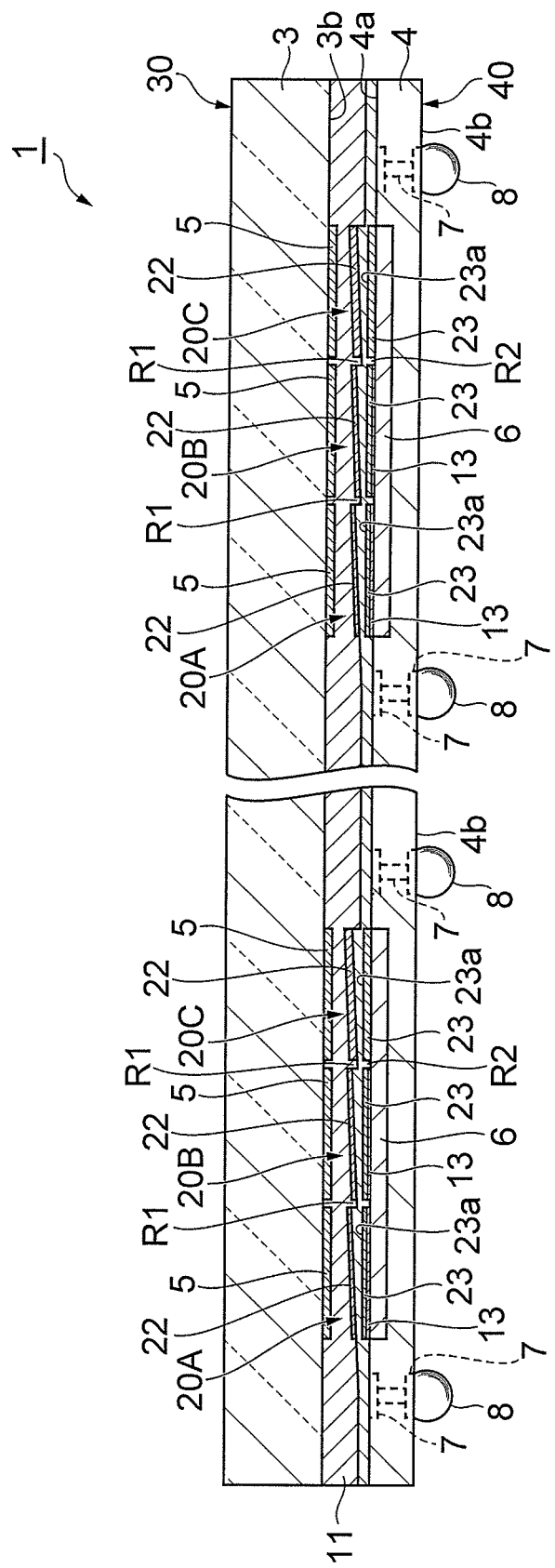
FIG. 8 is a sectional view for explaining the method of manufacturing the spectroscopic sensor of FIG. 1.

Subsequently, as illustrated in FIG. 8, the rear face of the light detection wafer 40 is shaved, polished, etched, and so forth, such that the light detection wafer 40 is thinned to a thickness of about 10 to 150 µm. Then, through holes are formed by etching in parts corresponding to surface leads, so as to produce through-hole leads, rear face leads, and the like, whereby the leads 7 are formed for each part corresponding to one spectroscopic sensor 1. Further, the bumps 8 are formed on the rear face of the light detection wafer 40 for each part corresponding to one spectroscopic sensor 1. Subsequently, as illustrated in FIG. 9, the light detection wafer 40 and light-transmitting wafer 30 joined together are diced for each part corresponding to one spectroscopic sensor 1, whereby a plurality of spectroscopic sensors 1 are obtained.

As explained in the foregoing, when forming the cavity layer 21 on the surfaces 23a of the DBR layers 23, the method of manufacturing the spectroscopic sensor 1 forms the cavity layer 23 integrally and allows a part of the cavity layer 21 to enter regions between the adjacent DBR layers 23, 23. This can avoid the cavity layer 21 from peeling off from the DBR layers 23 even when processes such as photo-etching and liftoff are performed for forming the DBR layers 22 on the cavity layer 21.

Reasons why the cavity layer 21 is likely to peel off from the DBR layers 23 in the photo-etching process for forming the DBR layers 22 will now be explained. The photo-etching process comprises (a) a step of spin-coating a substrate (light detection wafer 40) with a liquid photoresist, (b) a prebaking step, (c) a step of aligning a photomask and the substrate with each other and exposing them to light, (d) a baking step after exposure (which may be omitted), (e) a development step, and (f) a post-baking step.

During the spin coating with the resist in the step (a), the resist is homogenized on the surface of the substrate, while a centrifugal force acts thereon. Since the cavity layer 21 has differences in level here, an external force acts so as to peel off the cavity layer 21 at the time of spin coating. Also, as in the above-mentioned process, many baking steps (heat treatments) are performed, whereby the substrate is heated to about 80° C. to 120° C. Thus performing a plurality of heat treatments generates a stress because of a difference in thermal expansion between the resist and the substrate including the cavity layer 21 and DBR layers 23, thereby accelerating the peel-off of the cavity layer 21. The acceleration of peel-off becomes remarkable in particular in a photoresist employed in the liftoff process, which has a thickness on the order of 2 to several tens of gm. The development step, in which the resist is developed while an external force is applied thereto as in dipping, spinning, or showering, also incurs a force acting such as to peel off the cavity layer 21 from the DBR layers 23.

Reasons why the cavity layer 21 is likely to peel off from the DBR layers 23 in the liftoff process for forming the DBR layers 22 will now be explained. The liftoff process patterns a photoresist beforehand, so as to open it at a predetermined part. Thereafter, a film is formed on the whole surface by vapor deposition or the like. Then, while dipping the substrate in a solution (e.g., acetone or a resist remover) which dissolves the resist, an ultrasonic wave or a force such as a swinging force is applied thereto, so as to dissolve the resist and peel off the film on the dissolving resist. This selectively forms a film only in the opening part of the resist. When forming the DBR layers 22 in such a state, the cavity layer 21, if shaped like an island, peels off from the DBR layers 23 under a force caused by the dissolution or peel-off of the resist or an external force such as an ultrasonic wave or swinging force at the time of liftoff.

In view of the foregoing, integrally forming the cavity layer 21 and letting a part of the cavity layer 21 enter regions between the adjacent DBR layers 23, 23 is very effective in avoiding the cavity layer 21 from peeling off from the DBR layers 23 when forming the DBR layers 22 on the cavity layer 21.

The present invention is not limited to one embodiment thereof explained in the foregoing. For example, the light detection substrate 4 is not limited to the one-dimensional sensor, but may be a two-dimensional sensor. The thickness of the cavity layer 21 may change two-dimensionally or stepwise. In place of the DBR layers 22, 23, single-layer metal reflective films made of AL, Au, Ag, or the like may be employed as mirror layers. In place of the joints with the optical resin layer 11, joints at the outer peripheral parts of the spectroscopic sensor 1 may be employed. In this case, while keeping a gap with a spacer, joining with low-melting glass, solder, or the like is possible. A region surrounded by joints may be left as an air gap or filled with an optical resin. The optical filter layers 5 may be formed on the front face 3a side of the light-transmitting substrate 3 so as to oppose their corresponding interference filter units 20A, 20B, 20C.

The light-transmitting substrate 3 may be constituted by filter glass (color glass).

Industrial Applicability

The present invention can yield a highly reliable spectroscopic sensor.

REFERENCE SIGNS LIST

1 . . . spectroscopic sensor; 3 . . . light-transmitting substrate; 4 . . . light detection substrate; 5 . . . optical filter layer; 11 . . . optical resin layer; 20A, 20B, 20C . . . interference filter unit; 21 . . . cavity layer; 22 . . . DBR layer (first mirror layer); 23 . . . DBR layer (second mirror layer)

The invention claimed is:

1. A spectroscopic sensor comprising:
a plurality of interference filter units, having a cavity layer and first and second mirror layers opposing each other through the cavity layer, for selectively transmitting therethrough light in a predetermined wavelength range according to an incident position thereof;
a light-transmitting substrate, arranged on the first mirror layer side, for transmitting therethrough the light incident on the interference filter units; and
a light detection substrate, arranged on the second mirror layer side, for detecting the light transmitted through the interference filter units;
wherein the second mirror layers are separated for the respective interference filter units; and
wherein the cavity layer is formed integrally over the interference filter units, while a part of the cavity layer enters a region between the second mirror layers adjacent to each other,
the light-transmitting substrate is joined to the first mirror layer with an optical resin layer interposed therebetween and the cavity layer has outer edge parts reaching side faces of the light-transmitting substrate and the light detection substrate so that their side faces are flush with each other.

2. A spectroscopic sensor comprising:
a plurality of interference filter units, having a cavity layer and first and second mirror layers opposing each other through the cavity layer, for selectively transmitting therethrough light in a predetermined wavelength range according to an incident position thereof;
a light-transmitting substrate, arranged on the first mirror layer side, for transmitting therethrough the light incident on the interference filter units; and
a light detection substrate, arranged on the second mirror layer side, for detecting the light transmitted through the interference filter units;
wherein the second mirror layers are separated for the respective interference filter units;
wherein the cavity layer is formed integrally over the interference filter units, while a part of the cavity layer enters a region between the second mirror layers adjacent to each other
wherein the first mirror layers are separated for the respective interference filter units; and
wherein an optical resin layer for joining the light-transmitting substrate onto the first mirror layers enters a region between the first mirror layers adjacent to each other.

3. A spectroscopic sensor according to claim 2, further comprising an optical filter layer, formed on the light-transmitting substrate so as to oppose the first mirror layer, for transmitting therethrough the light in the predetermined wavelength range.

4. A spectroscopic sensor comprising:
a plurality of interference filter units, having a cavity layer and first and second mirror layers opposing each other through the cavity layer for selectively transmitting therethrough light in a predetermined wavelength range according to an incident position thereof;
a light-transmitting substrate, arranged on the first mirror layer side, for transmitting therethrough the light incident on the interference filter units; and
a light detection substrate, arranged on the second mirror layer side, for detecting the light transmitted through the interference filter units;
wherein the second mirror layers are separated for the respective interference filter units;
wherein the cavity layer is formed integrally over the interference filter units, while a part of the cavity layer enters a region between the second mirror layers adjacent to each other
further comprising an optical filter layer, formed on the light-transmitting substrate so as to oppose the first mirror layer, for transmitting therethrough the light in the predetermined wavelength range.

* * * * *